United States Patent
Shimazaki et al.

(10) Patent No.: US 7,706,111 B2
(45) Date of Patent: Apr. 27, 2010

(54) MOTOR LOCK DETECTION CIRCUIT

(75) Inventors: Tsutomu Shimazaki, Ota (JP); Shunji Suzuki, Gunma-ken (JP)

(73) Assignees: Sanyo Electric Co., Ltd., Osaka (JP); Sanyo Semiconductor Co., Ltd., Gunma (JP)

( * ) Notice: Subject to any disclaimer, the term of this patent is extended or adjusted under 35 U.S.C. 154(b) by 203 days.

(21) Appl. No.: 12/055,248

(22) Filed: Mar. 25, 2008

(65) Prior Publication Data
US 2008/0239594 A1 Oct. 2, 2008

(30) Foreign Application Priority Data
Mar. 26, 2007 (JP) ............... 2007-080045

(51) Int. Cl.
*H02H 7/08* (2006.01)
*H02H 5/04* (2006.01)

(52) U.S. Cl. ............... 361/29; 361/31; 318/434; 318/432; 318/400.35; 318/400.21

(58) Field of Classification Search .......... 318/434, 318/432, 400.35, 400.21; 361/29, 23, 31
See application file for complete search history.

(56) References Cited

U.S. PATENT DOCUMENTS

| | | | |
|---|---|---|---|
| 6,011,368 A * | 1/2000 | Kalpathi et al. ............ | 318/434 |
| 6,140,782 A * | 10/2000 | Chin ...................... | 318/400.31 |
| 6,198,241 B1 * | 3/2001 | Calamatas ................. | 318/434 |
| 6,320,337 B1 * | 11/2001 | Nishimura ............... | 318/400.05 |
| 6,979,970 B2 * | 12/2005 | Iwanaga et al. .......... | 318/400.35 |
| 7,042,180 B2 * | 5/2006 | Terry et al. ............. | 318/400.21 |
| 7,178,618 B2 * | 2/2007 | Komeda et al. .......... | 180/65.275 |
| 7,542,251 B2 * | 6/2009 | Ivankovic ................ | 361/23 |
| 2006/0193090 A1 * | 8/2006 | Ho ....................... | 361/23 |

FOREIGN PATENT DOCUMENTS

JP 2006-129671 5/2006

* cited by examiner

*Primary Examiner*—Rita Leykin
(74) *Attorney, Agent, or Firm*—SoCal IP Law Group LLP; Steven C. Sereboff; John E. Gunther (57) ABSTRACT

A motor lock detection circuit for detecting lock of a motor, comprising: a binarizing circuit to binarize a signal, obtained from the motor, having a frequency corresponding to rotation speed of the motor, to generate a binary signal; an edge detecting circuit to generate an edge detection signal when detecting an edge of the binary signal; a first counter to count based on a first counter clock, be reset according to the edge detection signal generated by the edge detecting circuit, and generate a count signal when counting for a first count period longer than an interval between edges of the binary signal; and a second counter to count based on a second counter clock, be reset according to the count signal, and generate a motor lock detection signal indicative of detection of lock of the motor when counting for a second count period longer than the first count period.

4 Claims, 6 Drawing Sheets

MOTOR LOCK DETECTION CIRCUIT

CROSS-REFERENCE TO RELATED APPLICATION

This application claims the benefit of priority to Japanese Patent Application No. 2007-080045, filed Mar. 26, 2007, of which full contents are incorporated herein by reference.

BACKGROUND OF THE INVENTION

1. Field of the Invention

The present invention relates to a motor lock detection circuit.

2. Description of the Related Art

When a motor is locked to become incapable of rotating by a driving force from a motor driving circuit, an overcurrent flows through the motor driving circuit to cause heat generation. In this case, if the motor driving circuit is configured as an IC, the IC may be destroyed. For this reason, the motor driving circuit is provided with a motor lock detection circuit that detects lock of the motor with using a square-wave-shaped FG signal having a frequency corresponding to the rotation speed of the motor (see, e.g., Japanese Patent Application Laid-Open Publication No. 2006-129671).

Figure 5:
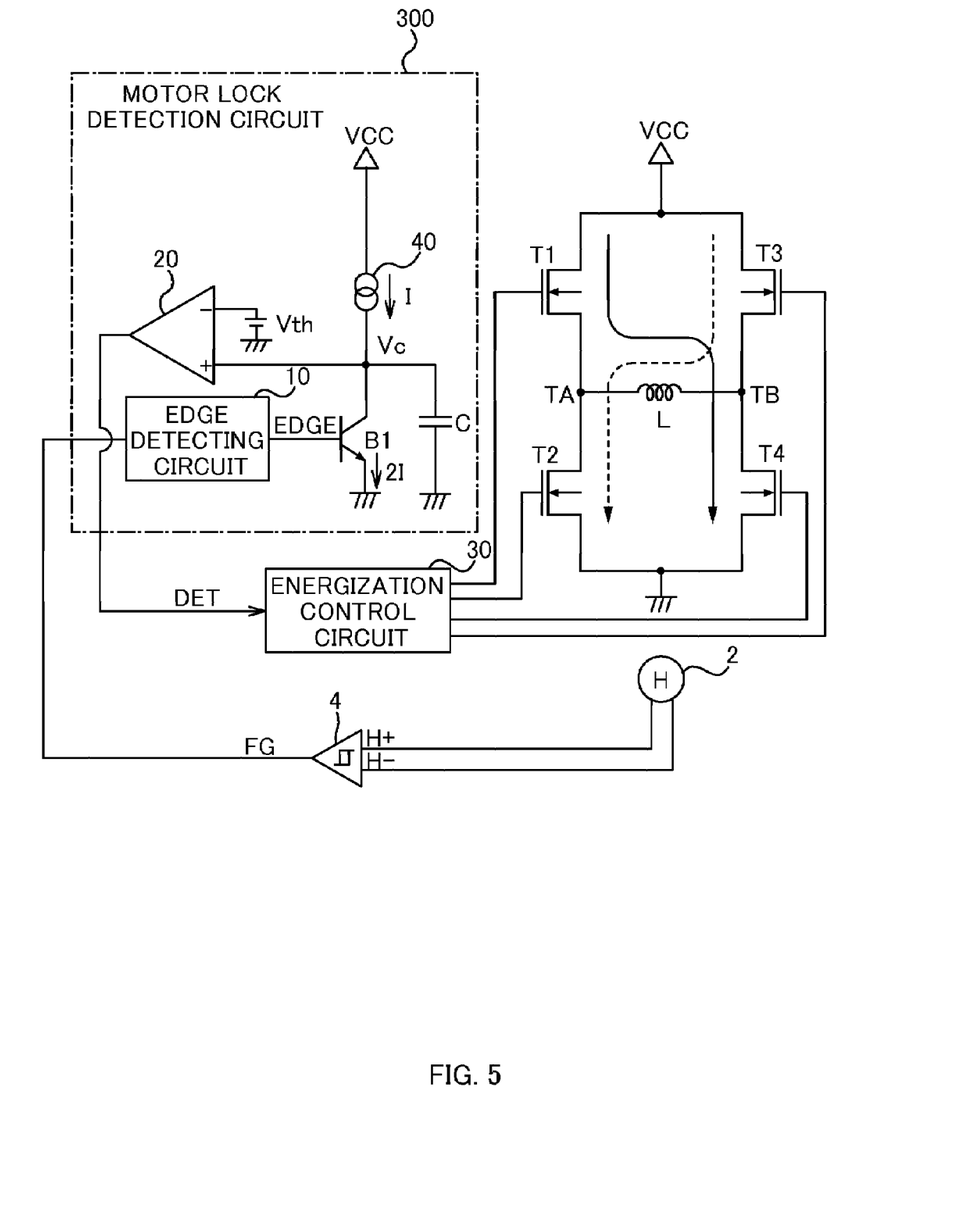
FIG. 5 is a diagram showing a configuration of a motor lock detection circuit and a peripheral circuit thereof.
Figure 6:
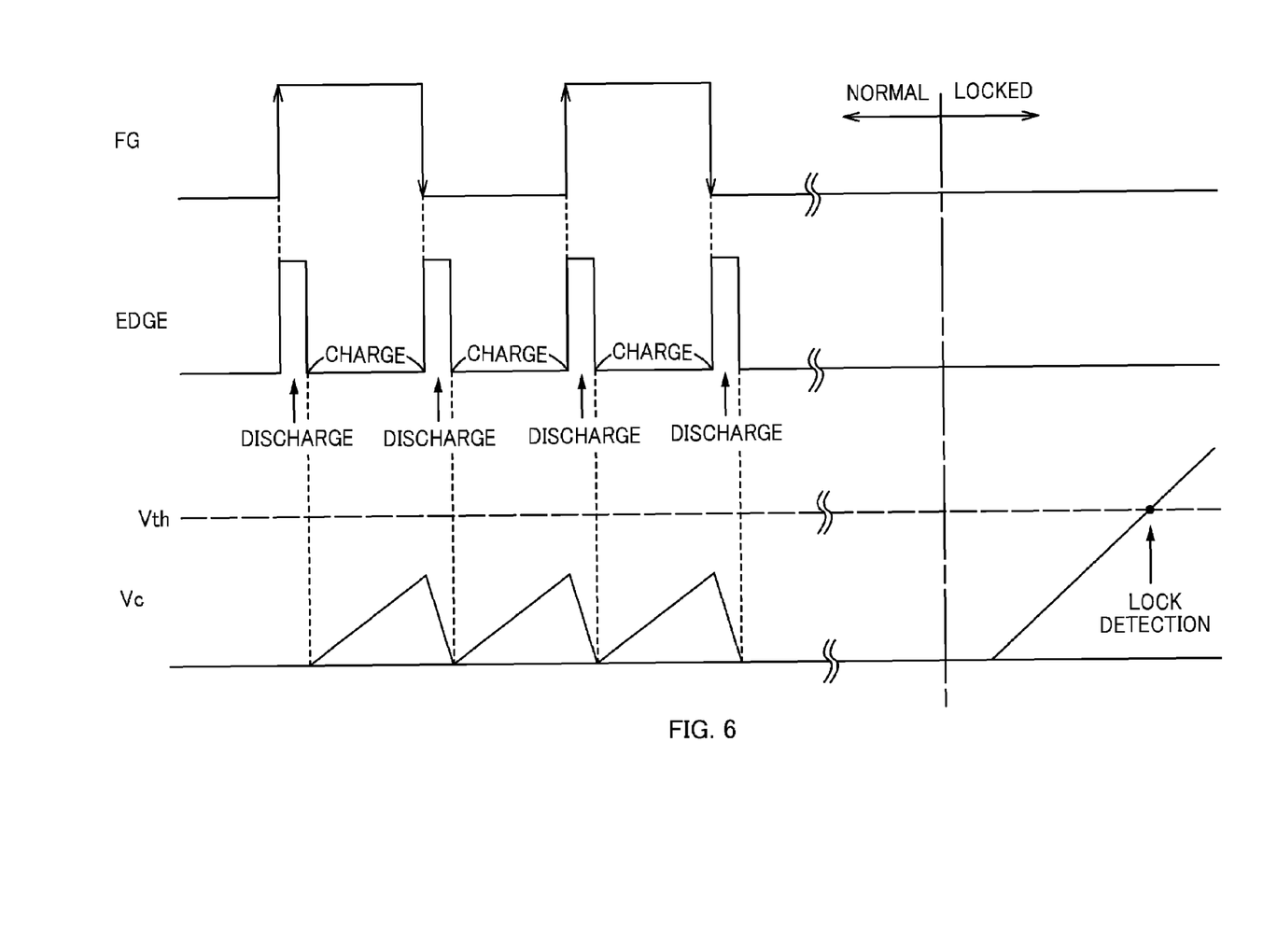
FIG. 6 is a waveform diagram showing a main signal of a motor lock detection circuit.

FIG. 5 is a diagram of a configuration of a motor lock detection circuit 300 and a peripheral circuit thereof, and FIG. 6 is an explanatory view of an operation of the motor lock detecting circuit 300. A motor shown in FIG. 5 is a sensor-equipped single phase motor including a single phase drive coil L and a Hall element 2 for detecting a rotor position. Drive transistors T1 and T2 are connected to one terminal TA of the drive coil L, and drive transistors T3 and T4 are connected to the other terminal TB thereof.

An energization control circuit 30 energizes the drive coil L by appropriately turning on and off the drive transistors T1 to T4, to rotate the single phase motor. As a result, the Hall element 2 outputs a rotor position detection signal H+ with a sine-wave shape and a rotor position detection signal H− with a cosine-wave shape. A hysteresis comparator 4 generates a full-wave rectification waveform using the rotor position detection signals H+ and H− output from the Hall element 2, and slices the full-wave rectified waveform at a predetermined level to generate a square-wave-shaped FG signal shown in FIG. 6.

An edge detecting circuit 10 outputs an edge detection signal EDGE of H level shown in FIG. 6 to the base electrode of an NPN transistor B1 when detecting an edge of the FG signal output from the hysteresis comparator 4. The NPN transistor B1 is turned on when the edge detection signal EDGE is at H level, and is turned off when the edge detection signal EDGE is at Low level. The current amplification rate of the NPN transistor B1 is determined so as to create a current twice as large as a constant current I (2I) from a constant current source 40.

When the NPN transistor B1 is off, the constant current I from the constant current source 40 flows into a capacitance element C, so that the capacitance element C is charged corresponding to the constant current I. While the capacitance element C is charged, a connection point voltage Vc at the connection point between the collector terminal of the NPN transistor B1 and one terminal of the capacitance element C rises in voltage level. Then, when the NPN transistor B1 switches from OFF to ON, it becomes necessary to cause a current twice as great as the constant current I to flow through the collector-emitter passage of the NPN transistor B1. This causes the constant current I corresponding to charges accumulated on the capacitance element C to flow through the collector-emitter passage of the NPN transistor B1, so that the level of the connection point voltage Vc at the connection point between the collector terminal of the NPN transistor B1 and one terminal of the capacitance element C drops. This is, the level of the connection point voltage Vc rises when the NPN transistor B1 is OFF, and drops when the NPN transistor B1 is ON, as shown in FIG. 6.

However, when the motor is locked, the rotor position detection signals H+ and H− output from the Hall element 2 are fixed to a DC offset level, and therefore, the FG signal does not have a square waveform (see FIG. 6), so that the comparator 20 keeps outputting the edge detection signal EDGE of L level (see FIG. 6). As a result, the NPN transistor B1 continues to be OFF, and the capacitance element C continues to be charged with the constant current I from the constant current source 40, so that the connection point voltage Vc continues to rise (see FIG. 6). When the connection point voltage Vc exceeds a threshold voltage Vth, the comparator 20 outputs a detection signal DET of H level. At this time, the energization control circuit 30 detects lock of the motor based on the H-level detection signal DET from the comparator 20. The energization control circuit 30 then turns off the drive transistors T1 to T4 to stop energizing the drive coil L in carrying out motor protection control.

In a case of the motor lock detection circuit as shown in FIG. 5, the capacitance variation of the capacitance element C, which is charged and discharges for detecting motor lock, greatly affects a detection time or detection precision in detecting motor lock. For example, if the capacitance of the capacitance element C is excessively larger than a proper capacitance in relation to the threshold voltage Vth, a time of charging the capacitance element C becomes longer. Because of this, when the motor is locked, the connection point voltage Vc takes a long time to exceed the threshold voltage Vth, so that it needs a long time to detect lock of the motor since the motor is locked in actuality. On the other hand, if the capacitance of the capacitance element C is excessively smaller than the proper capacitance, the connection point voltage Vc takes a short time to exceed the threshold voltage Vth, which causes misdetection due to noises generated in the connection point voltage Vc that the motor is in a locked state despite of the fact that the motor is not locked in actuality.

SUMMARY OF THE INVENTION

A motor lock detection circuit according to an aspect of the present invention, which detects lock of a motor, comprises: a binarizing circuit configured to binarize a signal, obtained from the motor, having a frequency corresponding to rotation speed of the motor, to generate a binary signal; an edge detecting circuit configured to generate an edge detection signal when detecting an edge of the binary signal; a first counter configured to count based on a first counter clock, be reset according to the edge detection signal generated by the edge detecting circuit, and generate a count signal when counting for a first count period longer than an interval between edges of the binary signal; and a second counter configured to count based on a second counter clock, be reset according to the count signal, and generate a motor lock detection signal indicative of detection of lock of the motor when counting for a second count period longer than the first count period.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

At least the following details will become apparent from descriptions of this specification and of the accompanying drawings.

<<Sensorless Motor Driving Circuit>>

Figure 1:
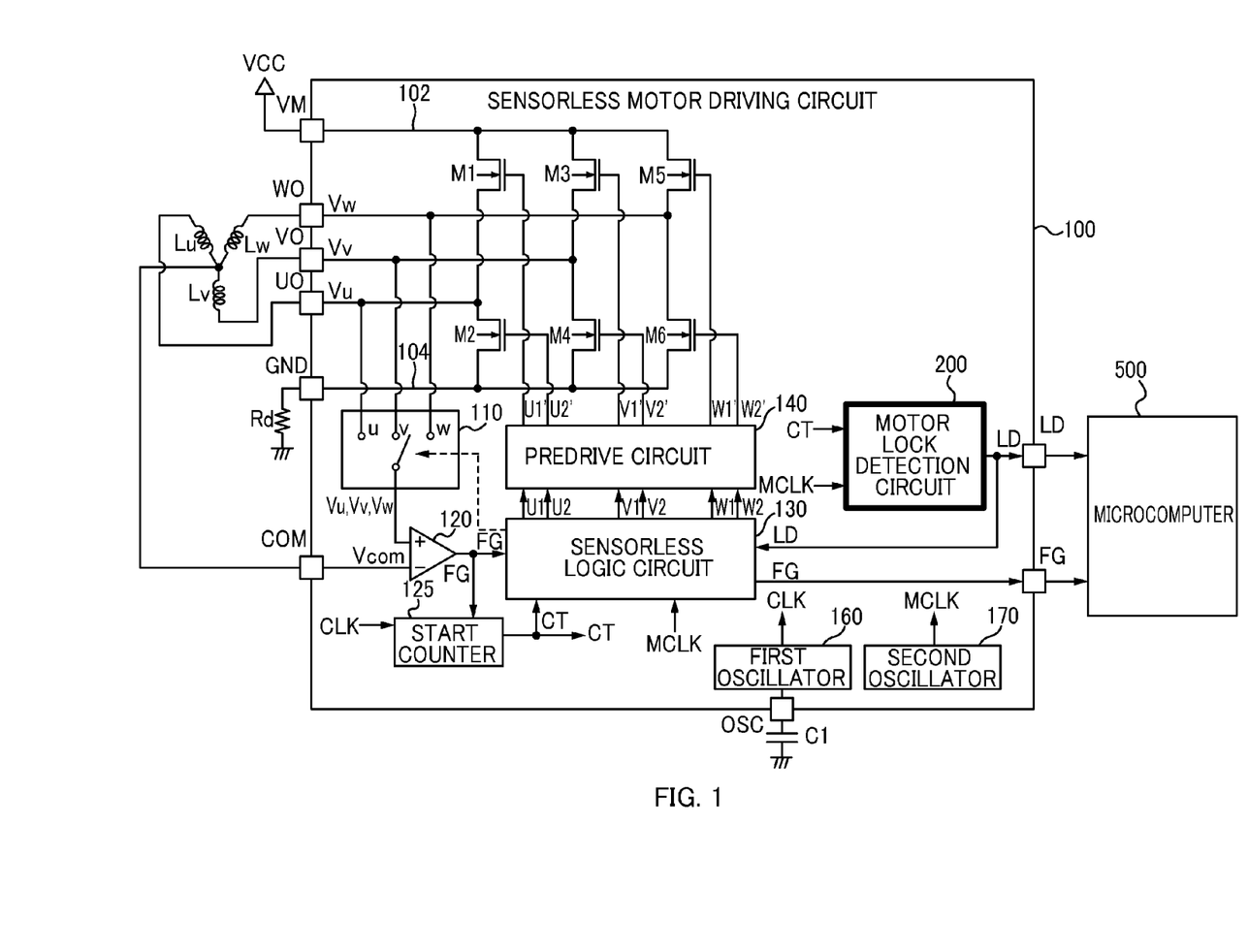
FIG. 1 is a diagram showing a configuration of a sensorless motor driving circuit including a motor lock detection circuit according to one embodiment of the present invention.
Figure 2:
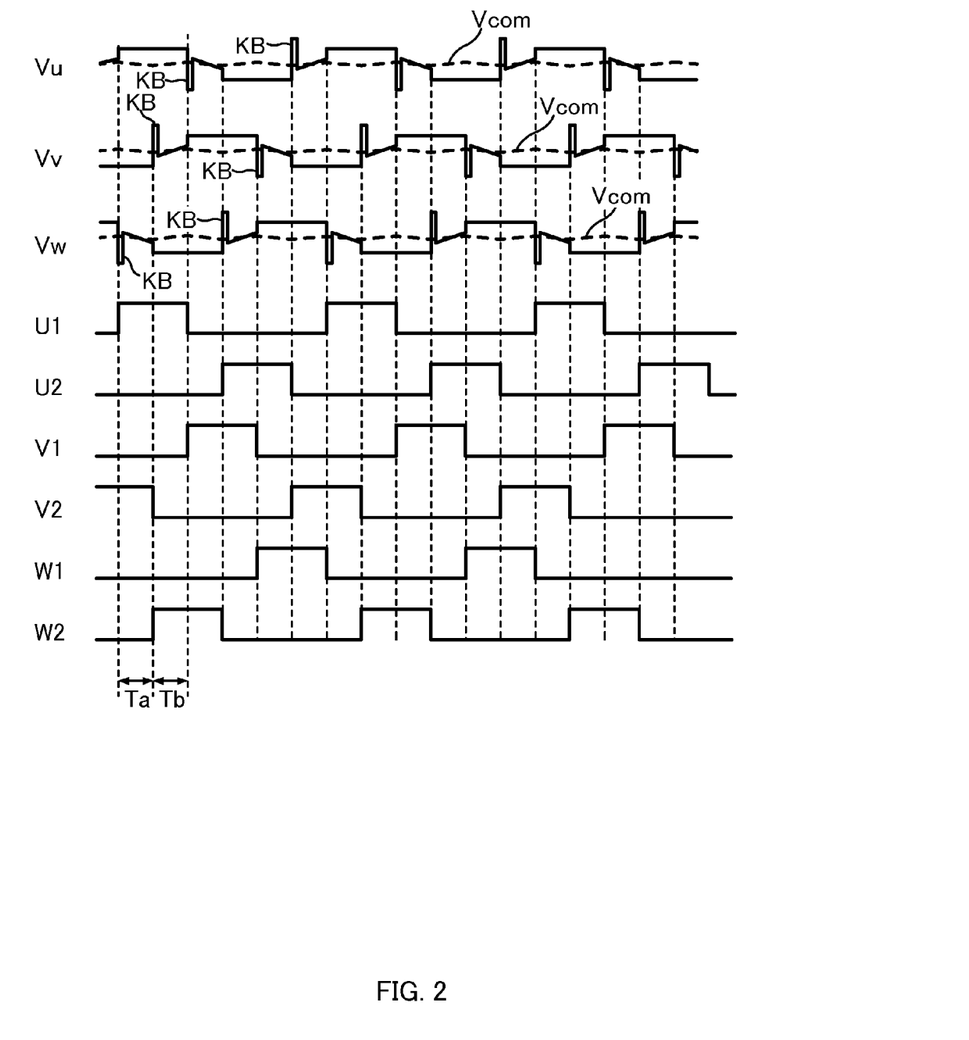
FIG. 2 is a waveform diagram showing a main signal of a sensorless motor driving circuit including the motor lock detection circuit according to one embodiment of the present invention.

A sensorless motor driving circuit 100 including a motor lock detection circuit according to one embodiment of the present invention will now be described using FIG. 1 with reference to FIGS. 2 and 3. Here, as a motor system including the sensorless motor driving circuit 100, there will be described, for example, a fan motor system that drives rotation of a motor (fan motor) for a fan (vane) emitting heat generated in electrical appliances (personal computer, air conditioner, refrigerator, etc.) to the outside. As the sensorless motor driving circuit 100, a Bi-CMOS process integrated circuit is described, for example.

Three phases (U-phase, V-phase, and W-phase) drive coils Lu, Lv, and Lw that are made by winding on a stator so as to be star-connected and displaced 120 electrical degrees in phase with respect to each other, are connected to a UO terminal, a VO terminal, and a WO terminal of the sensorless motor driving circuit 100, respectively. As a result of this, the three-phase drive coils Lu, Lv, and Lw are connected to a drive transistor circuit configured with NMOS field-effect transistors M1 to M6 via the UO terminal, the VO terminal, and the WO terminal.

The NMOS field-effect transistors M1, M3, and M5 disposed on the side of a source power line 102 are source side (discharging side) transistors discharging a coil current IL flowing from the source power line 102 toward the U-phase drive coil Lu, V-phase drive coil Lv, and W-phase drive coil Lw. The NMOS field-effect transistors M2, M4, and M6 disposed on the side of a sink power line 104 are sink side (absorbing side) transistors absorbing a coil current IL flowing from the U-phase drive coil Lu, V-phase drive coil Lv, and W-phase drive coil Lw toward the sink power line 104. In a present embodiment, the NMOS transistors M1, M3, and M5 disposed on the side of the source power line 102 are operated by saturation drive, and the NMOS transistors M2, M4, and M6 on the side of the sink power line 104 are operated by PWM drive (non-saturation drive).

When the NMOS field-effect transistors M1 to M6 are turned on and off at appropriate timing, the coil current IL corresponding to a level of a source voltage VCC is supplied to the three phase drive coils Lu, Lv, and Lw. This causes a sensorless motor to rotate in a predetermined direction (e.g., positive rotation), so that coil voltages Vu, Vv, and Vw displaced 120 electrical degrees in phase with respect to each other, are generated at one ends of the three phase drive coils Lu, Lv, and Lw. The coil voltages Vu, Vv, and Vw have a frequency corresponding to a rotation speed of the sensorless motor, and are applied to input terminals U, V, and W of a 3-input-1-output switch circuit 110 via the UO terminal, VO terminal, and WO terminal.

At a comparator 120 (binarizing circuit), a sensorless logic circuit 130 selects any one of the coil voltages Vu, Vv, and Vw applied to the input terminals U, V, and W of the switch circuit 110 in correspondence with any one phase of the U-phase, V-phase, and W-phase as an object of a zero cross point, which will be described later. The selected one of the coil voltages Vu, Vv, and Vw is applied to a positive terminal of the comparator 120 via an output terminal of the switch circuit 110. On the other hand, a neutral point voltage Vcom of the star connection of the three-phase drive coils Lu, Lv, and Lw is applied to a negative terminal of the comparator 120 via a COM terminal of the sensorless motor driving circuit 100. This is, the coil voltage applied to the positive terminal is any one of coil voltages Vu, Vv, and Vw to be selectively output from the switch circuit 110 as an object to be compared with the neutral point voltage Vcom. The neutral point voltage Vcom is a voltage at a connection point of the drive coils of two phases other than the phase as an object of detection of the zero cross point.

As a result of this, the comparator 120 detects the zero cross point, at which any one of the voltages Vu, Vv, and Vw selected at the switch circuit 110 and applied to the positive terminal and the neutral point voltage Vcom applied to the negative terminal cross each other. The comparator 120 then outputs a square waveform FG signal (binary signal) whose edge is switched between rising edge and falling edge at the zero cross point, to the sensorless logic circuit 130, and at the same time, outputs the FG signal to a microcomputer 500 via an FG output terminal. This allows the microcomputer 500 to detect a current rotation speed of the sensorless motor based on the FG signal so as to be able to adjust the on-duty of a PWM signal to be input to a PWM input terminal.

The sensorless logic circuit 130, in consideration of the sensorless motor's being incapable of determining the relative position of a rotor and a stator before the start of the motor, turns on and off the NMOS field-effect transistors M1 to M6 according to a predetermined order of energization, to perform a predetermined energization control for supplying the coil current to the drive coils Lu, Lv, and Lw of Uphase, Vphase, and Wphase. Specifically, the sensorless logic circuit 130, after removing (masking) noises corresponding to a kickback pulse KB from the FG signal output from the comparator 120, generates and outputs drive signals U1, U2, V1, V2, W1, and W2, based on such a resulting noise-free FG signal. The drive signals U1, V1, and W1 are the control signals for driving the gate electrodes of the NMOS field-effect transistors M1, M3, and M5, respectively, on the side of the source power line 102. The drive signals U2, V2, and W2 are the control signals for driving the gate electrodes of the NMOS field-effect transistors M2, M4, and M6, on the side of the sink power line 104.

The drive signals U1, U2, V1, V2, W1, and W2 output from the sensorless logic circuit 130 are input to a predrive circuit 140. There are output, from the predrive circuit 140, signals U1', U2', V1', V2', W1', and W2' amplified so as to drive NMOS field-effect transistors M1 to M6.

The FG signal output from the comparator 120 is input to the sensorless logic circuit 130, and also to a start counter 125. The start counter 125 is a counter that repeatedly performs counting operation for a predetermined count period in order to set a timing at which the sensorless logic circuit 130 switches energization of any one of the drive coils Lu, Lv, and Lw according to a start logic, when starting the sensorless motor.

Figure 3:
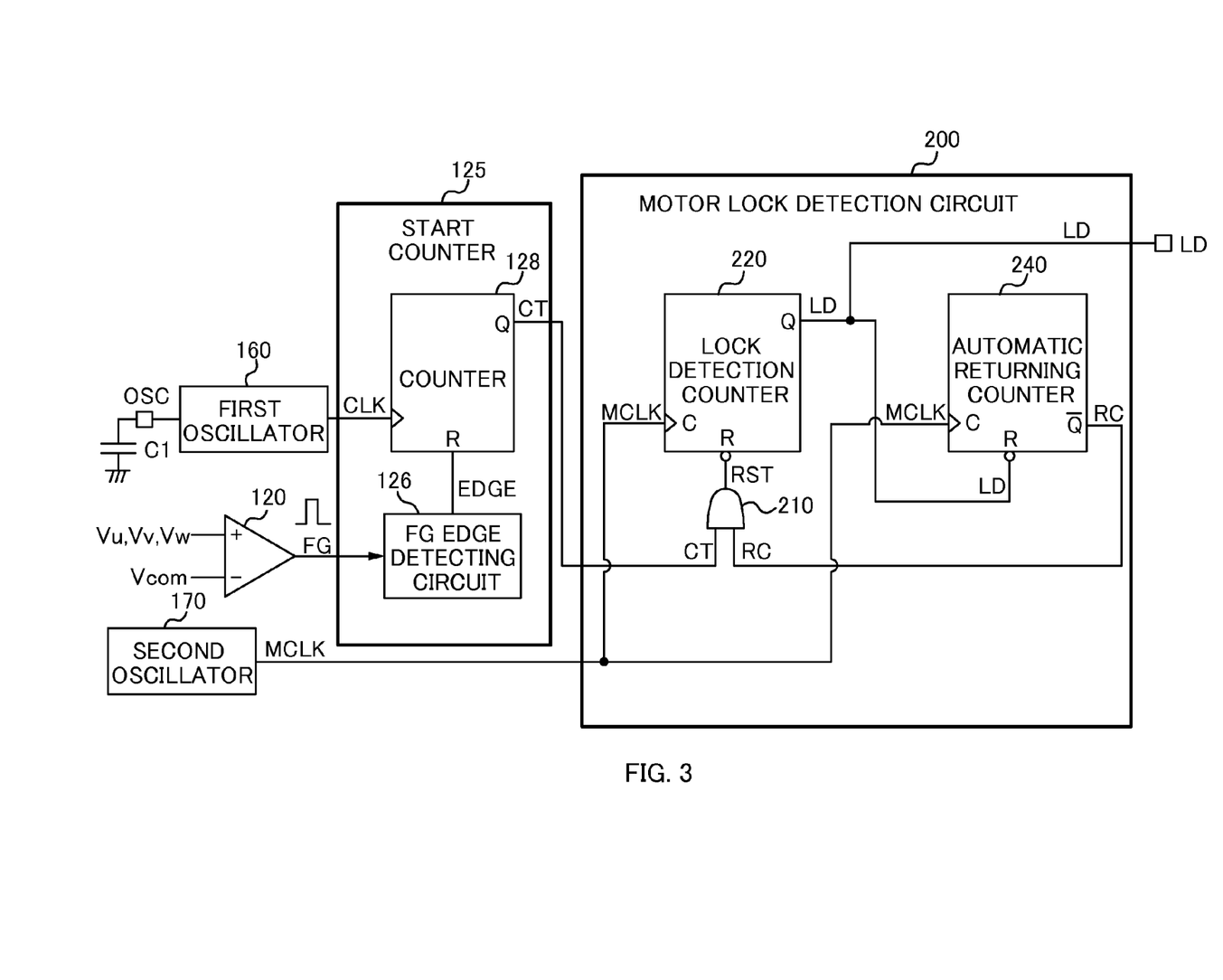
FIG. 3 is a diagram showing a configuration of a motor lock detection circuit and a peripheral circuit thereof according to one embodiment of the present invention.

Specifically, the starting counter 125 is configured with an FG edge detecting circuit 126 and a counter 128 (first counter), as shown in FIG. 3.

Figure 4:
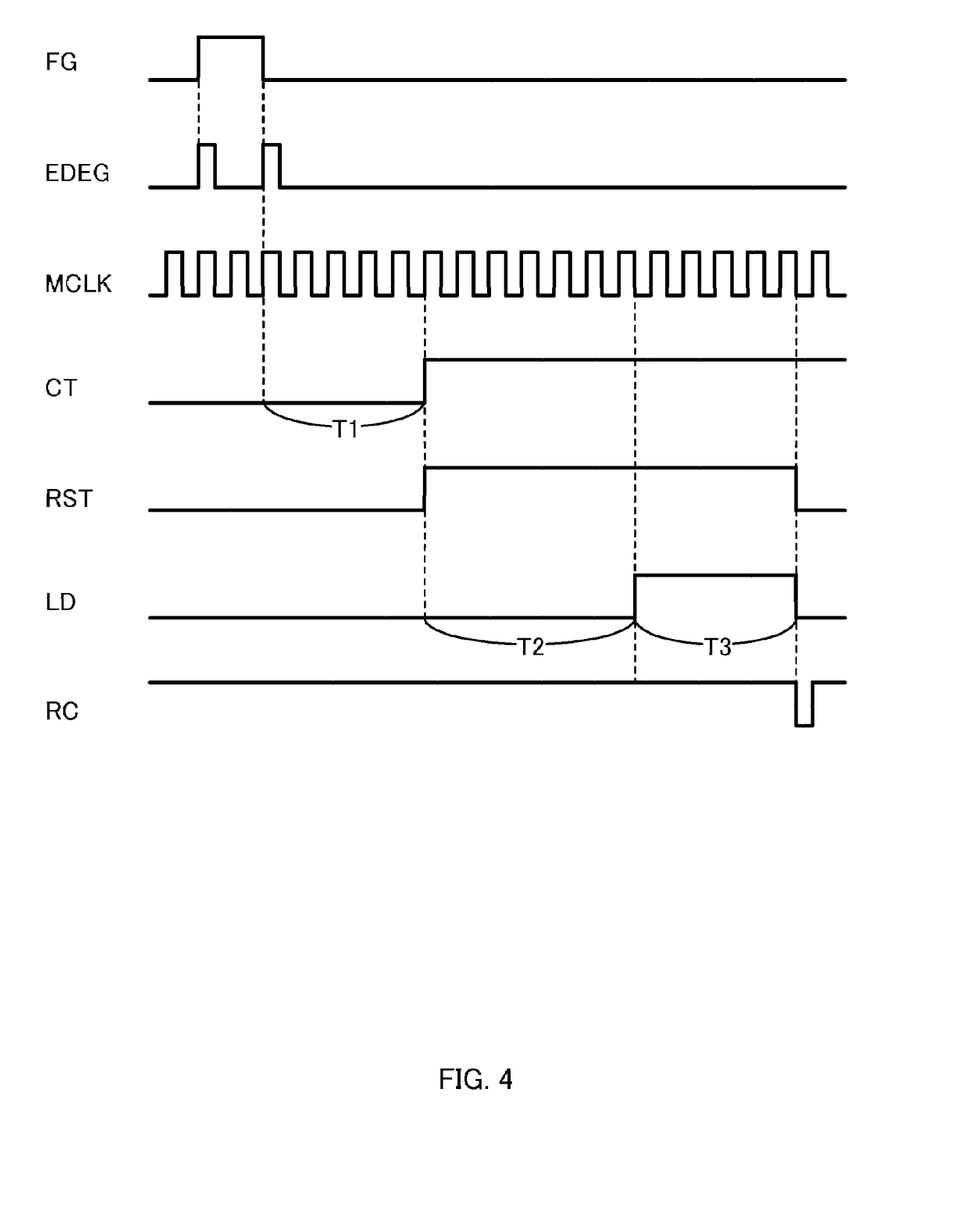
FIG. 4 is a waveform diagram showing a main signal of a motor lock detection circuit according to one embodiment of the present invention.

The FG edge detecting circuit 126 removes (masks) noises corresponding to the kickback pulse KB superposed on the FG signal, then detects an edge of the resulting noise-free FG signal, and outputs an edge detection signal EDGE indicating detection of the edge. The edge detection signal EDGE, as shown in FIG. 4, takes a waveform showing one pulse with H level for a predetermined period when detecting the edge of the FG signal.

The counter 128, based on a first clock CLK generated in a first oscillator 160, may repeat counting operation for a first count period T1 using the edge detection signal EDGE as a reset signal. The counter 128 outputs a count signal CT of H level when counting for the first count period T1 without being reset. The first count period T1 needs to be set so as to be longer than the edge interval of the FG signal.

The first oscillator 160 charges and discharges a capacitance element C1 connected to an OSC terminal to generate the first clock CLK having a first frequency. By the counting operation of the starting counter 125 based on the first clock CLK, when starting the sensorless motor, there is set a timing of switching energization among drive coils Lu, Lv, and Lw of phases (e.g., period corresponding to an electrical angle of 60 degrees). When adjusting the timing of switching energization according to a specification of the sensorless motor, that is, when adjusting the first frequency of the first clock CLK, the capacitance of the capacitance element C1 connected to the OSC terminal is adjusted.

Even though any of the drive coils Lu, Lv, and Lw is energized according to the starting logic, the sensorless motor remains stopped without rotating due to a relative position of the rotor and the stator. In this case, since the zero cross point at which any one of the coil voltages Vu, Vv, and Vw and the neutral point voltage Vcom cross each other is not detected, an edge of the FG signal output from the comparator 120 is not detected. At this time, the counter 128 cannot reset the counter operation, and, therefore, outputs the count signal CT of H level. As a result, the sensorless logic circuit 130 receives the count signal CT of H level from the start counter 125 to determine that the sensorless motor remains stopped. Based on this determination, the sensorless logic circuit 130 energizes any one of the drive coils Lu, Lv, and Lw to be energized next according to the starting logic.

As a result, when the sensorless motor starts rotating, the zero cross point, at which any one of the coil voltages Vu, Vv, and Vw and the neutral point voltage Vcom cross each other, is detected, so that an edge of the FG signal output from the comparator 120 is detected. At this time, the counter 128 is reset, and therefore, the count signal CT of H level is not output. That is since the count signal CT is maintained at L level, when the count signal CT is maintained at L level for a predetermined period, the sensorless logic circuit 130 can detect rotation of the sensorless motor and stop energization of the drive coils Lu, Lv, and Lw according to the starting logic.

<<Motor Lock Detection Circuit>>

A motor lock detection circuit 200 will be described using FIG. 3 with reference to FIG. 4.

Until an edge of the FG signal is detected, that is, until the sensorless motor starts, the start counter 125 outputs the count signal CT of H level every time the counter counts for the first count period T1, in order to set a timing for the sensorless logic circuit 130 to switch energization among the drive coils Lu, Lv, and Lw according to the starting logic. Once the sensorless motor starts, the counter is reset during the first count period T1 without fail, so that the count signal CT is maintained at L level. The sensorless logic circuit 130 detects the start of the sensorless motor when the count signal CT output from the start counter 125 is maintained at L level for the predetermined period, to stop energization control for the drive coils Lu, Lv, and Lw that is executed when starting the motor according to the starting logic.

When the sensorless motor is locked after the start thereof, an edge of the FG signal is not detected as in the same way when starting the sensorless motor. At this time, the counter 128 is not reset, and outputs the count signal CT of H level every time the counter counts for the first count period T1. The sensorless logic circuit 130 detects that the sensorless motor remains stopped, by the count signal CT of H level output from the start counter 125 every time the counter counts for the first count period T1. Then, the sensorless logic circuit 130, according to the starting logic, energizes any of the drive coils Lu, Lv, and Lw to be energized next. And thereafter, when the sensorless motor starts rotating, the zero cross point, at which the coil voltages Vu, Vv, and Vw and the neutral point voltage Vcom cross each other, is detected, thereby detecting an edge of the FG signal output from the comparator 120. At this time, the start counter 125 is reset during the first count period T1 without fail, and, therefore, keeps outputting the count signal CT of L level.

The motor lock detection circuit 200 detects lock of the sensorless motor by focusing on the change in level of the count signal CT that occurs when the sensorless motor is locked, as described above. Specifically, the motor lock detection circuit 200 includes an AND element 210, a lock detection counter 220 (second counter), and an automatic returning counter 240 (third counter).

The AND element 210 calculates the logical multiplication of the count signal CT output from the start counter 125 and a motor lock detection reset signal RC that is a reverse output from the automatic returning counter 240, and outputs the result of the calculation as a reset signal RST. When the sensorless motor is not locked after the start thereof, the count signal CT becomes L level (see FIG. 4), while the motor lock detection reset signal RC output from the automatic returning counter 240 becomes H level (see FIG. 4). As a result, the AND element 210 outputs the reset signal RST of L level (see FIG. 4). On the other hand, when the sensorless motor is locked after the start thereof, the start counter 125 outputs the count signal CT of H level (see FIG. 4) every time the counter counts for the first count period T1. At this time, the AND element 210 outputs the reset signal RST of H level (see FIG. 4).

The lock detection counter 220 counts for a second count period T2 longer than the first count period T1 according to a second clock MCLK (second counter clock, see FIG. 4) output from a second oscillator 170. The lock detection counter 220 is reset when the count signal CT of H level is generated (when the reset signal RST of H level is output from the AND element 210), and generates a lock detection signal LD of H level indicating detection of lock of the motor when counting for the second count period T2. The second clock MCLK has a frequency extremely higher than that of the FG signal shown in FIG. 4.

The second oscillator 170 includes, for example, a quartz oscillator, a ceramic oscillator, etc., and is incorporated integrally in the sensorless motor driving circuit 100. The second oscillator 170 generates the second clock MCLK having an intrinsic second frequency higher than the first frequency of the first clock CLK. Here, "intrinsic" means that the second frequency is not adjusted while the first frequency is adjusted. The second clock MCLK is thus serves as a system clock for the whole of the sensorless motor driving circuit 100. For example, the second clock MCLK is supplied to the sensorless logic circuit 130, the motor lock detection circuit 200, etc., to be used as a reference for their operation timing.

The lock detection counter 220 is reset continuously by the reset signal RST of L level (see FIG. 4) output from the AND element 210 when the sensorless motor is not locked after the start thereof. On the other hand, the reset of the lock detection counter 220 is canceled by the reset signal RST of L level (see FIG. 4) output from the AND element 210 when the sensorless motor is locked after the start thereof. When counting for the second count period T2, the lock detection counter 220 outputs the lock detection signal LD of H level.

In this manner, the lock detection counter 220 can detect lock of the sensorless motor after the start thereof since the count signal CT changes in level from L level to H level (see FIG. 4) to cause the reset signal RST output from the AND element 210 to change in level from L level to H level (see FIG. 4). The lock detection counter 220 then outputs the lock detection signal LD of H level (see FIG. 4) when counting for the second count period T2. Considering this, the second count period T2 is required to be set to be longer than the first count period T1 so that the lock detection counter 220 is not reset while the counter 128 counts for the first count period T1. The lock detection signal LD of H level is input to a reset input terminal of the automatic returning counter 240, and is output to the microcomputer 500 via an LD output terminal. Therefore, the microcomputer 500 can detect lock of the sensorless motor and execute predetermined motor protection control for the sensorless motor driving circuit 100.

The automatic returning counter 240 counts based on the second clock MCLK (second counter clock, see FIG. 4) output from the second oscillator 170, is reset when the lock detection signal LD of H level is generated, and generates a motor lock detection reset signal RC when counting for the third count period T3. The automatic returning counter 240 is reset continuously by the lock detection signal LD of L level (see FIG. 4) output from the lock detection counter 220 when the sensorless motor is not locked after the start thereof. On the other hand, the reset of the automatic returning counter 240 is canceled by the lock detection signal LD of H level (see FIG. 4) output from the lock detection counter 220 when the sensorless motor is locked after the start thereof. When counting for the third count period T3, the automatic returning counter 240 outputs the motor lock detection reset signal RC of L level (see FIG. 4).

In this manner, the automatic returning counter 240 detects lock of the sensorless motor after the start thereof since the lock detection signal LD changes in level from L level to H level (see FIG. 4). When counting for the third count period T3, the automatic returning counter 240 supplies the motor lock detection reset signal RC of L level (see FIG. 4) to the input terminal of the AND element 210. As a result of this, the reset signal RST output from the AND element 210 becomes L level (see FIG. 4), so that the lock detection counter 220 is reset. When the lock detection counter 220 is reset and the lock detection signal LD becomes L level, the automatic returning counter 240 is reset and the motor lock detection reset signal RC changes in level from L level to H level.

That is, the automatic returning counter 240 does not leave the lock detection counter 220 as it is when lock of the sensorless motor is detected in the lock detection counter 220, but resets the lock detection counter 220 such that a state thereof is automatically returned to a state before detection of motor lock when counting for the third count period. Therefore, since the motor lock detection reset signal RC of the automatic returning counter 240 changes in level from L level to H level, retrying is possible when detecting lock of the sensorless motor by mistake. The microcomputer 500 counts the number of motor lock detection signals LD of H level received through the LD output terminal. When the counted number exceeds a predetermined threshold, the microcomputer 500 detects that lock of the sensorless motor is not misdetected, to execute the predetermined motor protection control for the sensorless motor driving circuit 100.

<<Effect of an Embodiment According to the Present Invention>>

The motor lock detection circuit 300 shown in FIG. 5 is required to be provided with externally attached analog circuits, such as a capacitance element C and charge/discharge circuit. On the other hand, the motor lock detection circuit 200 of one embodiment according to the present invention is configured as a digital circuit in the sensorless motor driving circuit 100. Therefore, the circuit scale can be reduced of the system as a whole.

In the motor lock detection circuit 300, a motor lock detection time is set by adjusting the capacitance of the capacitance element C. On the other hand, in the motor lock detection circuit 200 of one embodiment according to the present invention, a motor lock detection time is set based on the second clock MCLK of the second oscillator 170. Specifically, according to an embodiment of the present invention, the setting of a lock detection time for the sensorless motor can be made by adding the first count period T1 at the start counter 125 and the second count period T2 at the lock detection counter 220. That is, according to an embodiment of the present invention, the characteristic varieties of an analog element, such as capacitance element C, exerts no influence on setting of the lock detection time for the sensorless motor. Therefore, the motor lock detection can be improved.

Further, in an embodiment according to the present invention, when motor lock is detected, there is carried out a motor protection operation of stopping the sensorless motor. The automatic returning counter 240 is provided for causing the lock detection counter 220 to carry out motor lock detection again after the passage of the third count period T3. As a result of this, the lock detection counter 220 can retry detection when lock of the sensorless motor is misdetected, due to the motor lock detection reset signal RC output from the automatic returning counter 240.

A PMOS transistor and a bipolar transistor as well as the NMOS transistor may be employed as the discharging side transistor and absorbing side transistor that drive the drive coils Lu, Lv, and Lw. Specifically, for example, PMOS transistor may be employed as the delivery side transistors and NMOS transistor may be employed as the suction side transistors. However, since NMOS transistor is more suitable for integration as compared to the PMOS transistor and the bipolar transistor, it is preferable to use the NMOS transistor for both of the discharging side transistor and the absorbing side transistor.

The sensorless motor is not limited to a three-phase motor, but may be a single-phase motor. In this case, an H-bridge circuit including two pairs of discharging side transistors and an absorbing side transistors is connected to a drive coil of the single-phase motor. The present invention can be applied to a sensor-equipped motor with a Hall element. In the case of the sensor-equipped motor in order to generate a signal corresponding to the count signal CT, it is necessary to provide a binarizing circuit that binarizes a rotor position detection signal in a shape of sine wave detected at the Hall element, an edge detecting circuit that detects an edge of a binary signal obtained from the rotor position detection signal, and a counter that is reset based on an edge of the binaring signal and that outputs a count signal CT every time the counter counts for a predetermined count period.

The above embodiments of the present invention are simply for facilitating the understanding of the present invention and are not in any way to be construed as limiting the present invention. The present invention may variously be changed or altered without departing from its spirit and encompass equivalents thereof.

What is claimed is:

1. A motor lock detection circuit for detecting lock of a motor, comprising:
  a binarizing circuit configured to binarize a signal, obtained from the motor, having a frequency corresponding to rotation speed of the motor, to generate a binary signal;
  an edge detecting circuit configured to generate an edge detection signal when detecting an edge of the binary signal;
  a first counter configured to count based on a first counter clock, be reset according to the edge detection signal generated by the edge detecting circuit, and generate a count signal when counting for a first count period longer than an interval between edges of the binary signal; and
  a second counter configured to count based on a second counter clock, be reset according to the count signal, and generate a motor lock detection signal indicative of detection of lock of the motor when counting for a second count period longer than the first count period.

2. The motor lock detection circuit of claim 1, further comprising
  a third counter configured to count based on a third counter clock, be reset according to the motor lock detection signal, and generate a reset signal when counting for a third count period, wherein
  the second counter is reset when the reset signal is generated.

3. The motor lock detection circuit of claim 1, wherein the motor includes
  a sensorless motor including drive coils of multiple phases, energization being switched for the drive coils every time the count signal is generated when starting the sensorless motor.

4. The motor lock detection circuit of claim 3, comprising:
  a first oscillator configured to output the first counter clock having a first frequency by charging and discharging a capacitance element; and
  a second oscillator configured to output the second counter clock and the third counter clock, each having a second frequency higher than the first frequency.

* * * * *